United States Patent [19]

Leighton et al.

[11] Patent Number: 4,995,081

[45] Date of Patent: * Feb. 19, 1991

[54] METHOD AND SYSTEM FOR PERSONAL IDENTIFICATION USING PROOFS OF LEGITIMACY

[76] Inventors: Frank T. Leighton, 965 Dedham St., Newton Center, Mass. 02159; Silvio Micali, 224 Upland Rd., Cambridge, Mass. 02140

[*] Notice: The portion of the term of this patent subsequent to Nov. 7, 2006 has been disclaimed.

[21] Appl. No.: 432,130

[22] Filed: Nov. 6, 1989

Related U.S. Application Data

[63] Continuation-in-part of Ser. No. 170,734, Mar. 21, 1988, Pat. No. 4,879,747.

[51] Int. Cl.$^5$ .............................................. H04K 1/00
[52] U.S. Cl. ......................................... 380/23; 380/24; 380/25; 380/30; 235/379; 235/380; 235/382; 364/409
[58] Field of Search ................ 364/409; 235/379, 380, 235/382; 380/23-25, 30; 340/825.31, 825.34

[56] References Cited

U.S. PATENT DOCUMENTS

| | | | |
|---|---|---|---|
| 3,154,761 | 10/1964 | O'Gorman | 235/380 |
| 3,383,657 | 5/1968 | Classen et al. | 340/825.34 |
| 3,569,619 | 3/1971 | Simjian | 235/380 |
| 3,576,537 | 4/1971 | Ernst | 235/380 |
| 3,581,282 | 5/1971 | Altman | 340/825.34 |
| 3,764,742 | 10/1973 | Abbott et al. | 380/23 |
| 3,896,266 | 7/1975 | Waterbury | 235/380 |
| 4,138,058 | 2/1979 | Atalla | 235/380 |
| 4,140,272 | 2/1979 | Atalla | 235/380 |
| 4,281,215 | 7/1981 | Atalla | 380/23 |
| 4,315,101 | 2/1982 | Atalla | 380/24 |
| 4,438,824 | 3/1984 | Mueller-Schloer et al. | 380/23 |
| 4,453,074 | 6/1984 | Weinstein | 380/23 |
| 4,501,957 | 2/1985 | Perlman et al. | 235/379 |
| 4,529,870 | 7/1985 | Chaum | 235/380 |
| 4,590,470 | 5/1986 | Koenig | 380/23 |
| 4,634,808 | 1/1987 | Moerder | 380/29 |
| 4,636,622 | 1/1987 | Clark | 235/380 |
| 4,712,103 | 12/1987 | Gotanda | 340/825.31 |
| 4,729,128 | 3/1988 | Grimes et al. | 382/58 |
| 4,731,841 | 3/1988 | Rosen et al. | 380/23 |
| 4,879,747 | 11/1989 | Leighton et al. | 380/23 |
| 4,882,779 | 11/1989 | Rahtgen | 380/24 |

FOREIGN PATENT DOCUMENTS 0102360 5/1987 Japan .

OTHER PUBLICATIONS

"Optical Memory Cards: The Ultimate Identification and Security Documents", by Robert B. Barnes, 2557 Charleston Road, Mountain View, California 94043; ID Expo Proceedings, 1988; pp. 502-1 through 503-1.

D. Parker, Fighting Computer Crime; pp. 327-334; Scribners & Sons, New York, 1983.

G. Simmons, "A System for Point of Sale or Access User Authentication and Identification", Advances in Cryptography; Crypto '81, 1981.

Secure Stand Alone Positive Personnel Identity Verification System (SSA-PPIV), by Paul D. Merillat, Sandia Labs., 3179.

A System for Verifying User Identity and Authorization at the Point-of Sale of Access, by Gustavus J. Simmons, Cryptologia; 1/84, pp. 1-21.

IBM Technical Disclosure Bulletin, vol. 21, No. 3, Aug. 1978: "One-Time Pad Digital Signature Technique", by M. Wegman.

Primary Examiner—Stephen C. Buczinski
Assistant Examiner—Bernarr Earl Gregory
Attorney, Agent, or Firm—David H. Judson

[57] ABSTRACT

The method and system for the invention utilizes any of a number of "proofs of legitimacy" to generate and verify a personal identification card. A card is generated by computing a digital signature of a non-secret password. The password and the digital signature are then encoded and stored on a magnetic stripe or other memory device of the card. To effect a transaction, the digital signature on a received card must be shown to have been generated from the password on the received card. The password preferably includes a digitized photograph of the authorized cardholder which is capable of being displayed at the transaction terminal. This enables the operator of the terminal to verify the identity of the cardholder by visual inspection.

17 Claims, 4 Drawing Sheets

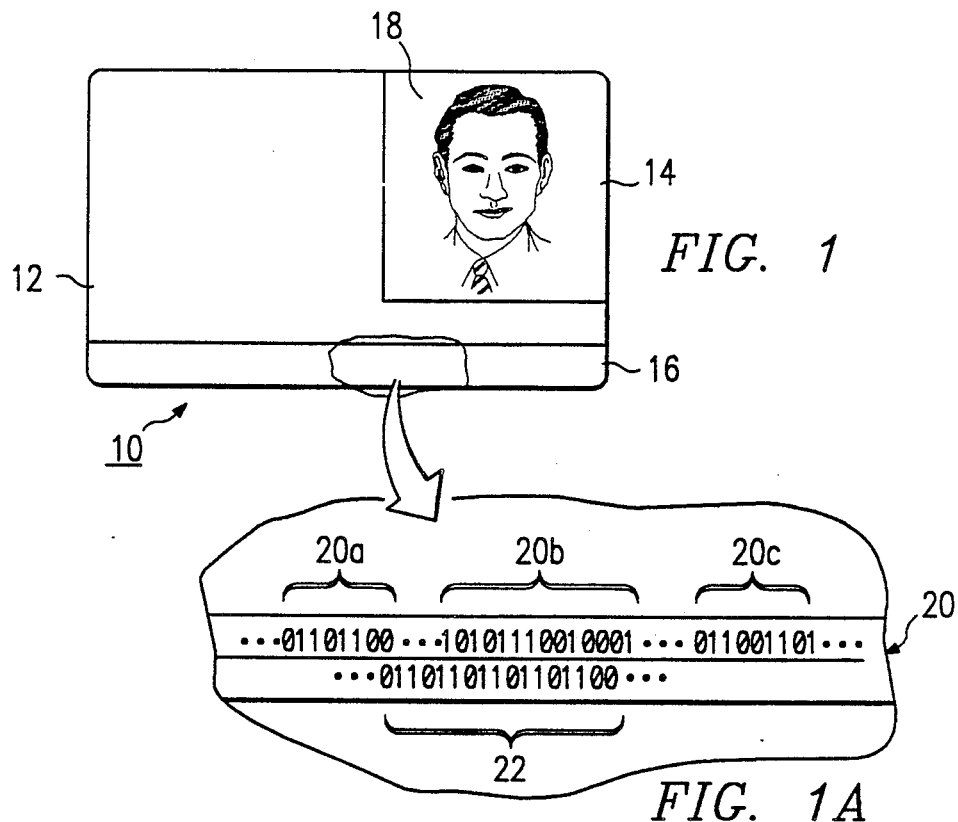
FIG. 1
FIG. 1A
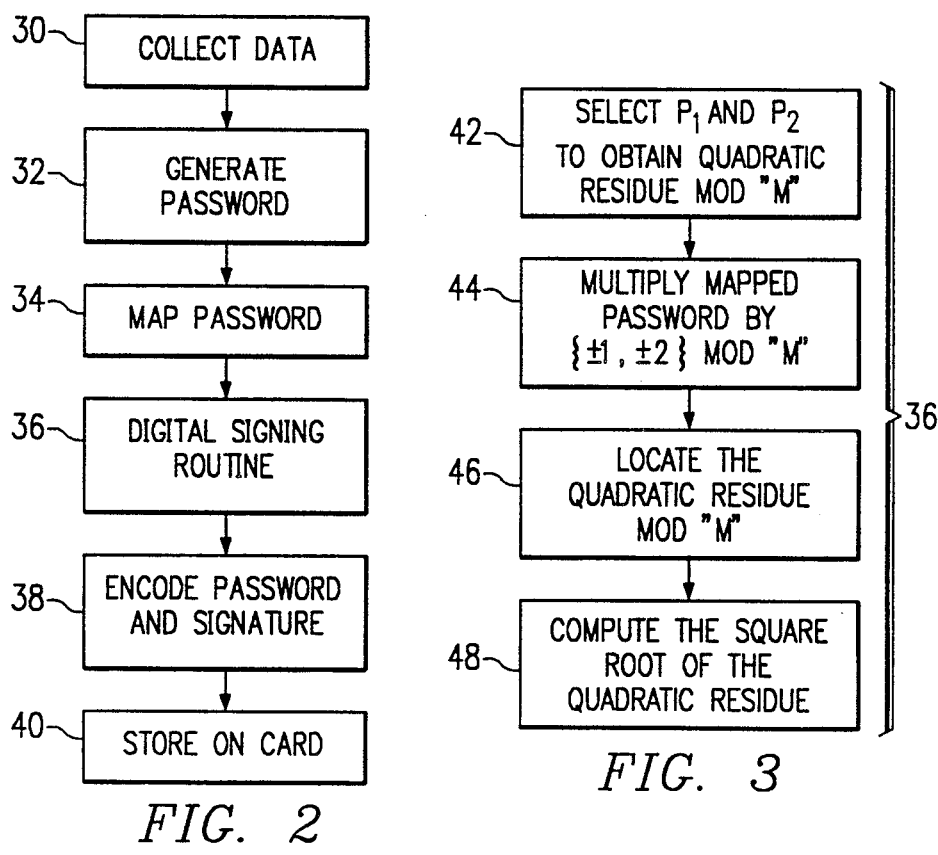
FIG. 2
FIG. 3

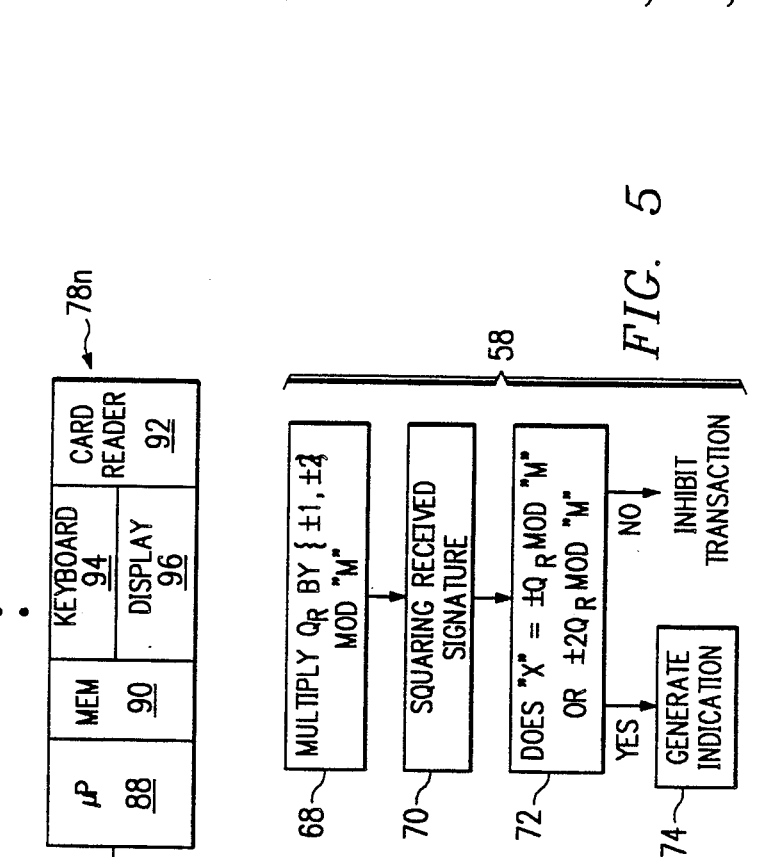

METHOD AND SYSTEM FOR PERSONAL IDENTIFICATION USING PROOFS OF LEGITIMACY

This application is a continuation-in part of prior copending application Ser. No. 07/170,734, filed Mar. 21, 1988, now U.S. Pat. No. 4,879,747.

TECHNICAL FIELD

The present invention relates generally to personal identification schemes and more particularly to a method and system for issuing authorized personal identification cards and for preventing unauthorized use thereof during transaction processing.

BACKGROUND OF THE INVENTION

Password based protection schemes for credit cards or other personal identification cards are well-known in the prior art. Such cards typically include a memory comprising a magnetic tape or other storage media affixed to the card. They may also include a data processing capability in the form of a microprocessor and an associated control program. In operation, a card issuer initially stores in the memory a personal identification number, i.e., a secret password, as well as a value representing a maximum dollar amount To effect a transaction, the card is placed in a terminal and the user is required to input his or her password If the terminal verifies a match between the user-inputted password and the password stored on the card, the transaction is allowed to proceed. The value of the transaction is then subtracted from the value remaining on the card, and the resulting value represents the available user credit.

Techniques have also been described in the prior art for protecting against the illegitimate issuance of credit cards such as the type described above. In U.S. Pat. No. 4,453,074 to Weinstein, each such card has stored therein a code which is the encryption of a concatenation of a user's secret password and a common reference text. The encryption is derived in an initialization terminal through the use of a private key associated with the public-key of a public-key cryptosystem key pair. In operation, a cardholder presents his or her card to a transaction terminal. The terminal decrypts the stored code on the card in accordance with the public-key of the public-key cryptosystem pair. A transaction is effected only if the stored code decrypts into the user password, inputted on a keyboard by the cardholder, and the common reference text.

While the method described in the Weinstein patent provides an adequate protection scheme for preventing the fraudulent issuance of credit cards, this scheme requires each user to have a secret or "private" password which must be memorized and inputted into the transaction terminal. Weinstein also requires additional circuitry for concatenting the user's secret password with the common reference text. This latter requirement, while purportedly required to insure the integrity of the protection scheme, increases the complexity and the cost of the system.

It would therefore be desirable to provide an improved method for issuing personal identification cards using a public-key cryptosystem or other "proof of legitimacy" in which a "secret" password need not be memorized by the authorized user or concatenated with a common reference text to maintain the system security.

BRIEF SUMMARY OF THE INVENTION

The present invention describes a method and system for issuing authorized personal identification cards and for preventing the unauthorized use thereof using a public-key cryptosystem, a private-key cryptosystem, a proof of possession of authorizing information such as a valid digital signature, or any other type of "proof of legitimacy."

According to one feature of the invention, each authorized user of a card is assigned a password having a portion thereof which is generated from a representation of some non-secret or "public" characteristic of the user. The password is then processed to produce a digital "signature" which, along with the password, is thereafter stored on the card. To authorize a transaction at a transaction terminal, the digital signature from a received card must first be shown to have been generated from the password on the received card. The password is also processed at the transaction terminal to display a representation of the "public" characteristic encoded thereon The public characteristic is then verified by an operator of the transaction terminal before a transaction is authorized.

In the preferred embodiment, the password includes data representing a pictorial representation of a physical characteristic (e.g., the face, fingerprint, voice sample or the like) of the authorized user. Alternatively, or in addition to the pictorial representation data, the password may contain other data pertinent to the user, such as the user's age, address, nationality, security clearance, bank account balance, employer, proof of ownership, or the like. The password may also include one or more codewords, each of the codewords authorizing a specific transaction such as permission to receive certain funds on a certain date, permission to see classified documents, permission to enter into a country on a certain date (i.e., a visa), attestation to perform certain acts, or the like. Although not meant to be limiting, the personal identification card may be a credit card, a driver's license, a passport, a membership card, an age verification card, a bank card, a security clearance card, a corporate identification card or a national identification card.

BRIEF DESCRIPTION OF THE DRAWINGS

For a more complete understanding of the present invention and the advantages thereof, reference is now made to the following Description taken in conjunction with the accompanying Drawings in which:

FIG. 1 is a schematic representation of one type of personal identification card according to the invention, the card having a picture of a physical characteristic of an authorized user of the identification card;

FIG. 1A is a diagrammatic representation of a portion of a magnetic stripe of the personal identification card of FIG. 1 showing a "password" generated in part from the picture on the identification card;

FIG. 2 is a general flowchart diagram of the preferred method of the present invention for issuing an authorized personal identification card such as shown in FIG. 1;

FIG. 3 is a detailed flowchart diagram of the digital signing routine of FIG. 2;

FIG. 5 is a detailed flowchart diagram of the digital verifying routine of FIG. 4

FIG. 6 is a block diagram of a representative multi-issuer system according to the present invention;

DETAILED DESCRIPTION

Figure 3A:
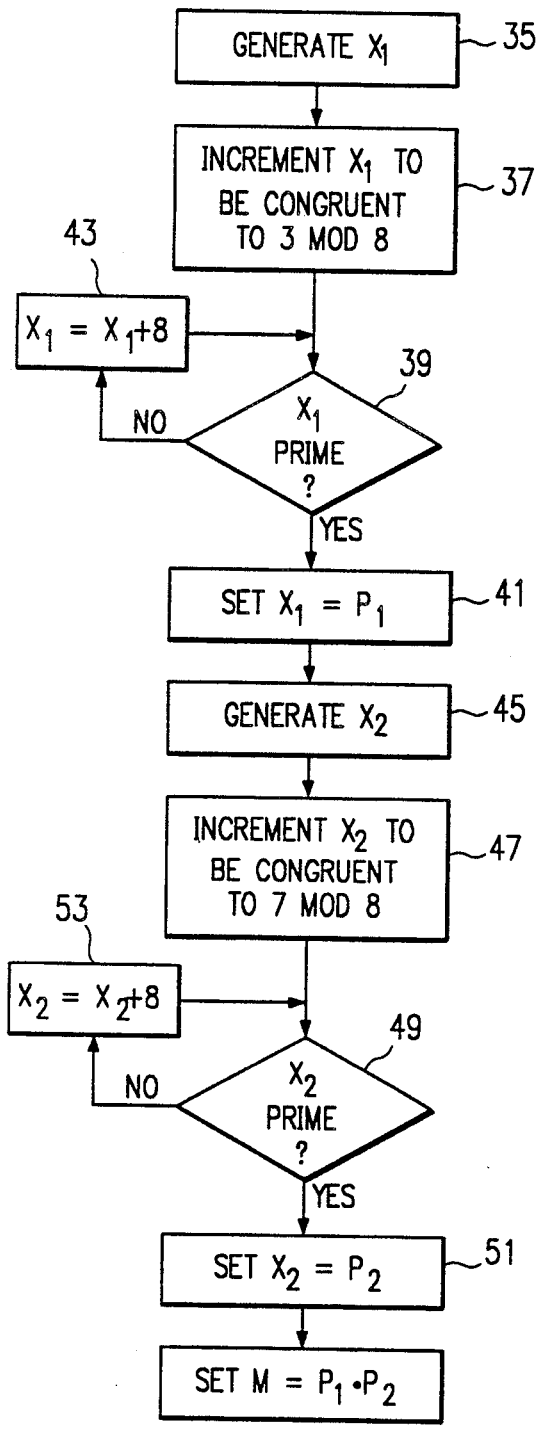
FIG. 3A is a flowchart diagram of a routine for selecting the secret prime numbers of the private key ($P_1, P_2$)

With reference now to the drawings wherein like reference numerals designate like or similar parts or steps, FIG. 1 is a schematic representation of a personal identification card 10 for use according to the present invention for effecting transactions via a transaction terminal. As noted above, the term "personal identification card" according to the present invention is to be read expansively and is deemed to cover credit cards or other commonly known forms of identification such as a passport, a driver's license, a membership card, an age identification card, a security clearance card, a corporate identification card, a national identification card, or the like.

Personal identification card 10 in FIG. 1 is a driver's license. Card 10 includes a body portion 12 having a display 14 and a memory 16. Although not meant to be limiting, the memory 16 is preferably a magnetic stripe or similar media, or an electronic memory such as a PROM, affixed to or embedded in the card in a known manner. The personal identification card may or may not include an integral microprocessor embedded in the body portion. As seen in FIG. 1, the display 14 of the personal identification card 10 supports a pictorial representation 18 of a physical characteristic of the authorized user; e.g., the user's face. Of course, the display 14 may also display pictorial representations of other physical features of the user such as the user's fingerprint or palm print.

Referring now to FIG. 1A, according to the present invention the memory 16 of the personal identification card 10 preferably includes a "password" 20 unique to the authorized user and having a portion 20a thereof which is generated from a representation of some non-secret or "public" characteristic of the user. As used herein, the term "non-secret" refers to the fact that the representation of the authorized user, such as the user's face, is readily ascertainable by viewing and comparing the personal identification card and the authorized user directly. In the preferred embodiment, the section 20a of the password is a digital bitstream representing a digitized version of the pictorial representation 18 on the personal identification card 10.

As also seen in FIG. 1A, the password 20 may include a portion 20b having data representing one or more personal facts about the authorized user such as the user's age, address, nationality, security clearance, employer, bank account balance, eye color, height, weight, mother's maiden name, or any other such information. This information may or may not be public.

Moreover, the password 20 may further include a portion 20c having one or more codewords, each of the codewords authorizing a specific transaction such as permission to enter a country on a certain date, permission to receive certain funds on a certain date, permission to review certain classified documents, or one or more other such specific transactions. Of course, the password 20 may include one or more of the predetermined types of data, 20a, 20b, and/or 20c, shown in FIG. 1A.

As also seen in FIG. 1A, the memory 16 of the personal identification card 10 also includes a signature 22, which, as will be described in more detail below, is derived from the password 20 using the private key of a "public-key cryptosystem" key pair. A "public-key cryptosystem" is a well known security scheme which includes two "keys," one key which is public (or at least the key pair owner does not really care if it becomes public) and one key which is private or non-public. All such public-key cryptosystem pairs include a common feature — the private key cannot be determined from the public-key.

Referring now to FIG. 2, a general flowchart diagram is shown of the preferred method of the present invention for issuing an authorized personal identification card 10 such as shown in FIG. 1. At step 30, the card issuer collects the necessary personal data from a card applicant. Although not meant to be limiting, this data preferably includes a pictorial representation of a physical characteristic of the authorized user. For example, the data may include a photograph of the card applicant. At step 32, the photograph, other personal data and/or code authorizations are processed to generate a password as described above in FIG. 1A.

At step 34, the password is mapped with a predetermined one way function "F" to generate a mapped password "Q" which may have a length substantially less than the length of the password. This "mapping" step is typically required to reduce the length of the digital bitstream comprising the password, especially when a digitized photograph of the authorized user is stored therein. By way of example only, the predetermined one-way function "F" may be any one or more of several well-known, i.e., public, hashing functions such as one obtainable from the DES scheme or the Goldwasser, Micali & Rivest scheme Alternatively, the function "F" may be an identity function which simply transfers the password through step 34 without modification. The identity function might be used where the password length is sufficiently smaller than the available storage capability of the memory 16.

At step 36, the method continues to "digitally sign" the mapped password "Q" with a private key $(P_1, P_2)$ of a public-key cryptosystem pair to generate a so-called "signature". As will be described in more detail below, in the preferred embodiment "$P_1$" and "$P_2$" are secret prime numbers and the public-key cryptosystem pair includes a public-key "M" which is equal to "$P_1 \cdot P_2$". At step 38, the method encodes the password (as opposed to the mapped password) and the signature with an error-correcting code to generate an encoded password/signature. Step 38 insures that the card 10 will be usable even if some of its data is destroyed. At step 40, the encoded password/signature is stored on the personal identification card in the manner substantially as shown in FIG. 1A.

Although not shown in detail in FIG. 2, it should be appreciated that the card issuer may digitally sign one or more digital signatures on the card 10 at one or more different times using different public-key cryptosystem pair keys. The card could then function as a passport with each signature derived from a different cryptosystem key pair corresponding to a different country (i.e., a visa). It may also be desirable in the method of FIG. 2 to include an additional encryption step wherein the password is encrypted with a predetermined function prior to the mapping step and/or where the signature itself is encrypted. This enables the card to carry information which is desired to be maintained highly confidential even if the card were lost or stolen Referring now to FIG. 3, a detailed flowchart diagram is shown of the preferred digital signing routine of the present invention. As described above, "M" is the public-key of the public-key cryptosystem and ($P_1,P_2$) is the private key thereof. According to the routine, the secret prime numbers "$P_1$" and "$P_2$" are selected at step 42 such that when the mapped password Q is multiplied by four predetermined factors, $\pm 1$ modulo "M" and $\pm 2$ modulo "M," one and only one of the resulting values $\pm Q$ mod M and $\pm 2Q$ mod M is a quadratic residue modulo "M". The security of the preferred digital signing routine is based primarily on the fact that is it extremely difficult to compute the square root of the quadratic residue modulo "M" without knowing the factorization of $M = P_1 \cdot P_2$.

Referring back to FIG. 3, at step 44 the mapped password "Q" is multiplied by each of the factors $\pm 1$ mod M and $\pm 2$ mod M. The routine continues at step 46 wherein each of the resulting values $\pm Q$ mod M and $\pm 2Q$ mod M are evaluated to locate the quadratic residue mod "M". When this value is located, the routine computes the square root thereof at step 48 to generate the digital signature.

Although not shown in detail, it should be appreciated that the private key may include any number of secret prime numbers ($P_1, P_2, P_3, \ldots P_n$). Preferably, the secret prime numbers are selected according to the routine shown in FIG. 3A. At step 35, an n-bit random number "$x_1$" is generated. The number of bits "n" needs to be large enough (e.g., 250 bits) such that it is difficult to factor "M" At step 37, $x_1$ is incremented to be congruent to a predetermined value, e.g., "3 mod 8". At step 39, a test is made to determine if $x_1$ is prime. If so, then the routine continues at step 41 by setting $x_1 = P_1$. If xl is not prime, then $x_1$ is incremented at step 43 (by setting $x_1 = x_1 + 8$) and the routine returns to step 39. Once $P_1$ is selected, the routine continues at step 45 to generate another n-bit random number "$x_2$". At step 47, $x_2$ is incremented to be congruent with a second predetermined value, e.g., "7 mod 8". At step 49, a test is made to determine if $x_2$ is prime. If so, then the routine continues at step 51 by setting $x_2 = P_2$. If $x_2$ is not prime, then $x_2$ is incremented at step 53 (by setting $x_2 = x_2 + 8$) and the routine returns to step 49. Once $P_2$ is selected the public-key "M" is set equal to $P_1 \cdot P_2$ at step 55.

It is also desirable to store $P_1$ and $P_2$ in the issuing terminal responsible for computing signatures. Moreover, it is possible to distribute the private key ($P_1,P_2$) from one terminal to another without any person being able to discern the key by using another public-key cryptosystem pair (for which the private key is known only to the receiving terminal). Moreover, while the digital signing routine of FIG. 3 is preferred, other schemes, such as RSA, the Goldwasser, Micali & Rivest scheme and/or the Rabin scheme, may be used. Such schemes may also require knowledge of the public-key, although the routine of FIG. 3 does not. In any case the process of generating the "signature" is fast if the private key is known but is prohibitively slow otherwise. Any attempt to issue counterfeit cards is complicated further by the use of a one-way function "F" to hash the password into the mapped password "Q" In this way, it becomes virtually impossible for a counterfeiter to mount a chosen-text attack on the card generation scheme even if the counterfeiter could somehow obtain signatures for fake personal data.

Figure 4:
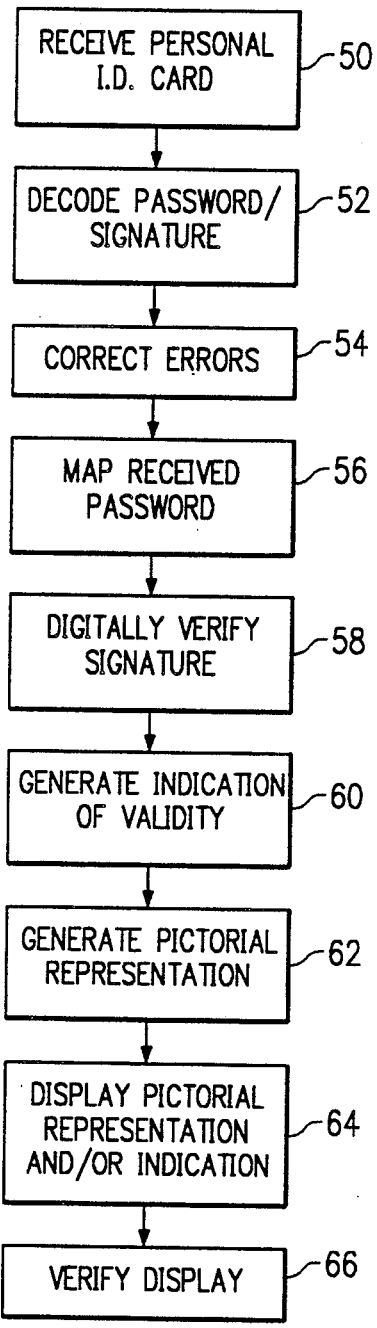
FIG. 4 is a general flowchart diagram of the preferred method of the present invention for preventing unauthorized use of the personal identification card of FIG. 1 which is issued according to the method of FIG. 2.

Referring now to FIG. 4, a general flowchart diagram is shown of a preferred method for preventing unauthorized use of the personal identification card 10 issued according to the routines of FIGS. 2-3. At step 50, the personal identification card is received at a transaction terminal. At step 52, the encoded password/signature is decoded to generate a received password and a received signature. Preferably, the method includes a step 54 wherein errors in the received password and received signature are corrected in accordance with well known techniques. At step 56, the received password is mapped, with the same predetermined function "F" used at the issuing terminal, to generate a mapped password "$Q_R$" for the received personal identification card.

The routine then continues at step 58 to verify that the received signature is "valid" In particular, the method digitally verifies, using the public-key of the public-key cryptosystem pair, whether the received signature can be generated from the mapped password "$Q_R$". If so, the method continues at step 60 to generate an indication that the received signature is valid. At step 62, a representation is generated from data in the received password. This representation will be a picture if the original password stored on the card included a digitized photograph of the authorized cardholder. Of course, step 62 can be performed in parallel with steps 58 and 60 so that the picture is immediately displayed while the signature verification takes place. Referring back to FIG. 4, at step 64, the method displays either the pictorial representation or the indication, or both, on a display of the transaction terminal. This display is then verified by an operator of the terminal at step 66 to insure that the cardholder is authorized to effect a transaction.

It should be appreciated that the personal identification card generated according to the method of FIG. 2 can be used in any situation requiring user identification. For example, and not by way of limitation, the authorized user can present the card to an authorized salesperson for charging a purchase. The salesperson would enter the card into the transaction terminal which is capable of reading the data from the card's memory, verifying that the (digital) signature on the card is valid, and displaying on the display screen information derived from the password. The salesperson can therefore be assured that the cardholder's identity is as claimed and proceed with the charge.

Referring now to FIG. 5, a detailed flowchart is shown of the preferred digital verification routine of FIG. 3. At step 68, the routine multiplies the mapped password "$Q_R$" from the received personal identification card by each of the factors $\pm 1$ mod M and $\pm 2$ mod M. The method continues at step 70 by squaring modulo "M" the received signature to generate a value "X". At step 72, a test is made to determine whether "X" equals either $\pm Q_R$ mod M or $\pm 2Q_R$ mod M. If so, the routine continues at step 74 to generate the indication that the received signature is valid. If "X" does not equal any one of these four factors, the signature is invalid and the transaction is inhibited.

Of course, the method and system of the present invention is easily adaptable to a multi issuer scenario where several parties desire to issue cards using different cryptosystem pairs, but where verifiers (i.e., operators of transaction terminals) need to authenticate a card from any of the issuers. This can be accomplished by encoding the public-key used by each issuer into each transaction terminal and then requiring the operator thereof to enter into the terminal both the identity of the issuer along with the card itself; alternatively, the identity of the card issuer can be encoded on the card. This type of system is shown in FIG. 6, wherein a plurality of issuing terminals 76a . . . 76n are provided for one or more independent issuers of authorized personal identification cards. Each of the independent issuers is assigned or selects a distinctive public-key cryptosystem pair unknown to the other issuers. As noted above, the public-key of each such pair is then encoded into each of the one or more transaction terminals 78a . . . 78n which are shared by all of the issuers.

The system of FIG. 6 is useful for passport control, national identification cards, or multi-company credit cards, although such applications are not meant to be limiting. In operation of a passport system, for example, each country would have complete autonomy over the personal identification cards it issues, but a single transaction terminal would be used to authenticate the signature (which could include a visa) of any country.

Although not described in detail, it can be appreciated by those skilled in the art that the method and system of the present invention can be readily implemented with preexisting hardware and software. In the preferred embodiment, and as shown in FIG. 6, each of the issuing terminals 76 includes a microcomputer 80 and associated memory devices 82 for storing operating programs and application programs for carrying out the method steps of FIG. 2. Input/output devices, such as a keyboard 84 and display 86, are provided for interfacing the terminal to the card issuer. Of course, one or more of the method steps (e.g., the digital signing step, the mapping step and the encoding step) can be implemented in either gate array logic chips or software. Likewise, each of the transaction terminals 78 preferably includes a microprocessor 88, associated memory 90, and appropriate input/output devices such as cardreader 92, keyboard 94 and display 96.

While the above discussion relates specifically to protection schemes for personal identification cards, it should be appreciated that the password/signature security routines of the present invention may also be used where the personal data is transmitted over a communications channel as opposed to being stored on an identification card per se. Returning back to FIG. 6, this aspect of the invention is achieved by providing a communications channel 100, e.g., a telephone link via modems, between an issuing terminal 76b and a transaction terminal 78a.

In operation, the method steps of FIG. 2 would be the same as previously described except that step 40 is deleted and a step of transmitting the encoded password/signature over the communications channel 100 is substituted therefor. Likewise, step 50 of the verification routine in FIG. 4 is deleted and is substituted with a step whereby the information provided over the communications channel 100 is received at the transaction terminal and then processed according to the remainder of the steps in FIG. 4. In this way, the password/signature method is used for personal identification where the medium for supporting and transmitting the password and the signature is the communications channel itself rather than the identification card.

The above-identified invention thus describes a scheme for personal identification and verification that uses a digital signature process based on a public-key cryptosystem pair to authorize a password containing some physical characteristic of a card holder. The basic identification scheme, however, need not necessarily be based on public-key cryptography. Rather, the scheme can be generalized to use of any "proof of legitimacy" including, but not limited to, a public-key cryptosystem. As used herein, a "proof of legitimacy" is a means or method by which a prover (e.g., the card holder) can prove to a verifier (e.g., a passport control officer) that some information (by way of example but not limitation, a password containing a picture of the card holder) was authorized by an authorizing party (e.g., the United States Government). While as described above the proof of legitimacy can be based on a digital signature of the password using a public-key cryptosystem pair, the present invention also envisions the use of any proof of legitimacy in connection with the idenfication scheme.

Figure 7:
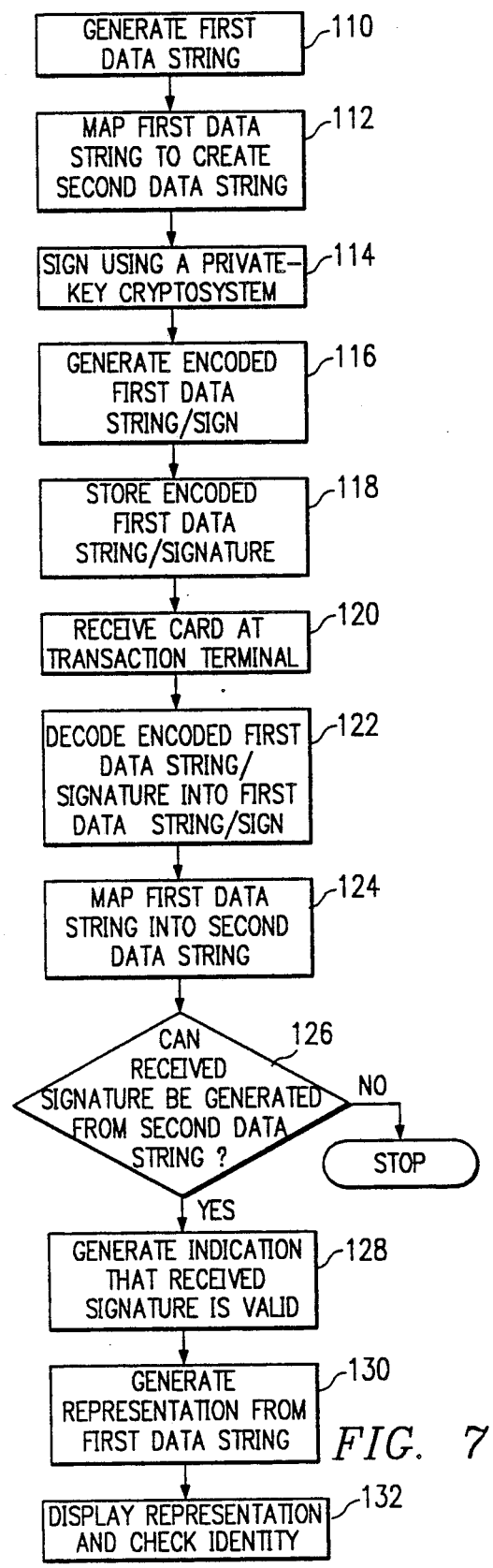
FIG. 7 is a flowchart diagram of an alternate embodiment of the invention wherein a private-key cryptosystem is used to generate a digital signature of a password.

For example, digital signatures can also be generated using a private key cryptosystem. With reference now to FIG. 7, one such alternate method for proving legitimacy uses a private-key cryptosystem to generate a digital signature that can be verified by a verifier who knows some secret information (as well as some public information). A private-key cryptosystem consists of two or more parties sharing a common, secret key (or collection of keys) and an encryption/decryption algorithm. In the preferred embodiment of FIG. 7, a method for enabling an authorized user of a personal identification card to effect a transaction using a transaction terminal begins at step 110 with the generation of a first data string (i.e. a "password") having a portion thereof which is derived from a physical characteristic of the authorized user and need not be retained secret. At step 112, the first data string is mapped using a predetermined function F to generate a second data string Q having a length substantially less than the length of the first data string. These steps have been described generally above. The method continues at step 114 wherein the second data string is digitally signed, e.g., but without limitation, decrypted with a private key of a private-key cryptosystem to generate a signature corresponding to the second data string.

At step 116, the first data string and the signature generated at step 114 are encoded to generate an encoded first data string/signature. Thereafter, at step 118, the encoded first data string/signature is stored on the personal identification card and initialization is thus complete.

To effect verification, the method continues at step 120 wherein the personal identification card is received at a transaction terminal. At step 122, the encoded first data string/signature on the received personal identification card is decoded to generate the first data string and a received signature. The first data string is then mapped at step 124 with the predetermined function F to generate the second data string. At step 126, a test is performed to determine if the received signature can be generated from the second data string using the same private-key used at step 114. For example, if step 114 is effected by decrypting with a private key, step 126 encrypts with the proper private key of the private-key cryptosystem If so, the method continues at step 128 to generate an indication that the received signature is valid. At step 130, a representation is generated from the first data string and, at step 132, displayed (preferably along with the indication that the signature is valid) on a display of the transaction terminal. As described above with respect to the public-key cryptosystem embodiment, this display enables an operator thereof to verify that the user is authorized to effect a transaction using the personal identification card.

It should be appreciated that steps 130 and 132 need not be performed after steps 126 and 128. The generation and display of the representation from the first data string can be carried out simultaneously therewith or even before if desired. Therefore, the order of steps 126–132 as described above (or with respect to FIG. 4) should not be taken by way of limitation).

As also described above, if desired the method shown in FIG. 7 can proceed without the mapping steps 112 and 124, however, these steps typically will be required where the password is a digitization of the cardholder's picture. Likewise, the encoding and decoding steps 116 and 122 can be omitted because these steps merely provide an additional level of security, reliability and/or privacy. For example, the data string and/or password mignt be stored in an encrypted form and/or in an error-correcting-coded form.

Figure 8:
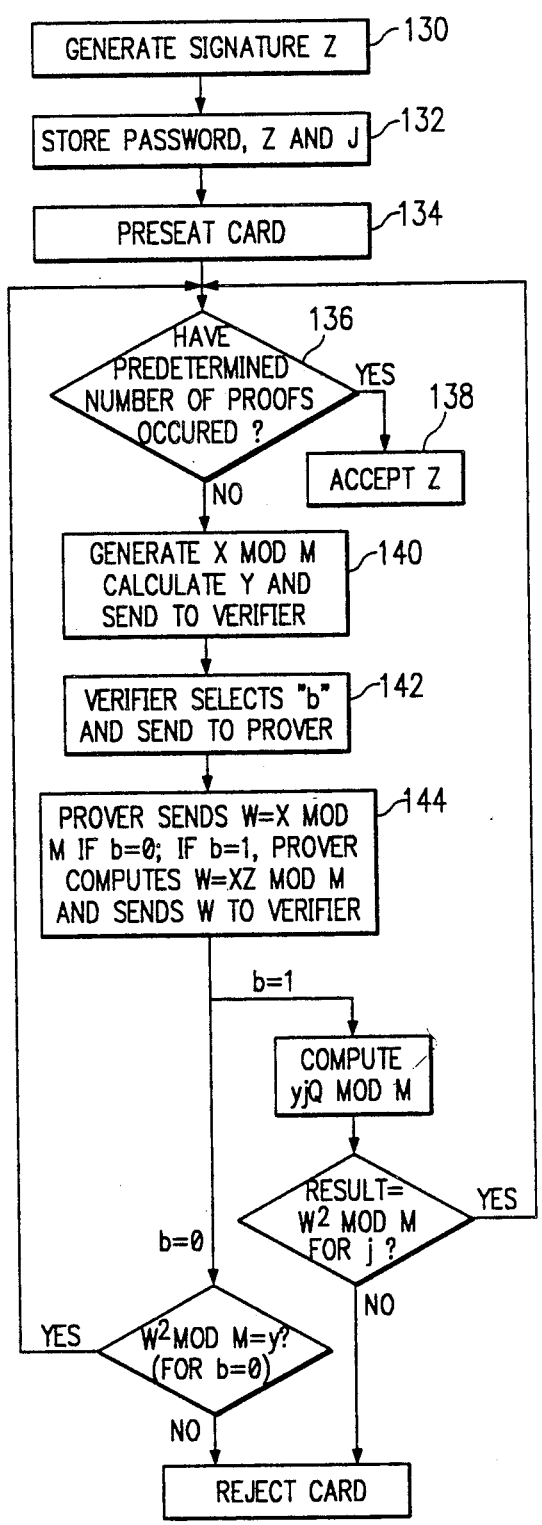
FIG. 8 is a flowchart diagram of yet another embodiment of the present invention wherein a personal identification card is verified by the cardholder's proof of possession of authorizing information such as a valid signature.

In yet another embodiment of the invention as described in FIG. 8, a "proof of legitimacy" is effected by the cardholder convincing the verifier that he or she has some valid information (generated by a proper authority) without ever revealing the information to the verifier. In the preferred embodiment, but without limitation, such valid information is a digital signature of a password as previously described. In the scheme of FIG. 8, the personal identification card is a so called "smart" card that is well-known in the prior art and includes a microprocessor, associated storage and control programs for providing simple processing of data. The card normally also includes some suitable input/output capability to enable data to be read from or written to the storage area of the card.

In the method of FIG. 8, the authorizing party possesses a private key $(P_1, P_2)$ of a public-key cryptosystem pair for use in generating a signature "z" of a mapped password "Q." The public-key cryptosystem has a corresponding public-key M, where $M = P_1 \cdot P_2$ and $P_1$ is congruent to 3 modulo 8 and $P_2$ is congruent to 7 modulo 8. This aspect of the invention was described above with respect to FIGS. 3 and 3A. The method begins at step 130 with the generation of the signature "z." At step 132, the authorizing party stores on the card the password, the signature "z," and the one of the four predetermined factors, $j = \pm 1$ modulo "M" and $\pm 2$ modulo "M," that causes one of the values $\pm Q$ mod M and $\pm 2Q$ mod M to be a quadratic residue modulo "M". Signature z is the square root modulo M of this quadratic residue. Although not described in detail, it should be appreciated that the password, the signature and the predetermined factor "j" can be encoded before being stored on the card as described above.

The method continues at step 134 when the card holder presents the card for verification and the card is received in the transaction terminal. In the preferred embodiment, the transaction terminal includes a conventional card reader device that can communicate with the microprocessor on the "smart" card and transmit data back and forth. At step 136, a test is made to determine whether a predetermined number (preferably thirty (30)) of "legitimacy proofs" have been carried out. If so, the method continues at step 138 as will be described below. If a predetermined number of legitimacy proofs have not been carried out, the method continues at step 140 wherein the prover, i.e. the microprocessor in the card generates a random number x mod M, squares the random number to generate the value $y = x^2 \mod M$, and then provides y to the transaction terminal. In response to receiving y, at step 142 the transaction terminal randomly chooses a "0" or a "1" bit b and sends the chosen bit back to the prover, i.e., the microprocessor in the smart card.

The method continues at step 144 where if $b = 0$, the prover sends back the value W x modulo M to the transaction terminal; if $b = 1$, the prover computes the value $W = xz \mod M$ and sends the value W back to the transaction terminal. If $b = 0$, the transaction terminal continues at step 146 by determining whether $W^2$ modulo M is equal to y. If $b = 1$, however, the transaction terminal computes yjQ mod M at step 150 and then checks, at step 152, to see that the result is equal to $W^2$ modulo M for some choice of j among $\pm 1$ and $\pm 2$. If the result of either test 146 or 152 is positive, the method returns to step 136. If all legitimacy proofs are correct, the method continues at step 138 to accept that the prover has a valid signature for the password. If the result of any test 148 or 152 is negative, the proof of legitimacy is not verified and the signature and card are rejected.

The method described in FIG. 8 is advantageous for several reasons. First, the prover never sends the signature z to the verifier; rather, he or she sends a random number "x mod M" or z times this random number. In either case, the verifier cannot easily compute z. This is because z is unrelated to x and the product of z and x mod M looks random to the verifier since the verifier does not know the random number. (The verifier does know the square of x mod M, but is is practically impossible to compute x mod M from the square without knowledge of the secret key which the verifier may or may not have).

Second, despite the limited information the verifier is provided, it is still possible to verify that the prover has the signature z. If the prover has both x mod M and xz mod M, it is easy for the prover to compute z by simple modulo division. During the proof of legitimacy, the prover convinces the verifier that he or she knows z by convincing the verifier that he or she knows both x mod M and xz mod M. This is because the prover is consistently able to compute either x mod M or xz mod M (depending on whether $b = 0$ or $b = 1$) on demand after having sent y to the verifier (thereby committing himself to such a value x mod M). While the prover may be "lucky" enough to provide the requested information once (e.g., if the verifier requests x and the prover can provide it), the probability of doing so thirty of more times in a row is less than one in a billion.

As described above, in the embodiment of FIG. 8, the cardholder need not have a digital signature of a picture. For example, during initialization of the card, the user's picture can be taken and then mapped to a string x that is a quadratic residue modulo M. Rather then signing the picture, the authority generating the card can then sign a statement such as "Whoever proves that he or she possesses a square root of x modulo M is legitimately authorized by this authority." During the verification process, the cardholder convinces the transaction terminal that it has this square root. In place of the square root, other authorizing information about x, which may or may not be a signature, may be used.

According to another feature of the invention, the mapped password may be encrypted prior to being signed or, alternatively, the signature generated from the mapped password may be encrypted. Stated more generally, the present invention envisions the use of some "encoding/decoding" steps to enhance security. This aspect was described in a specific fashion with respect to FIGS. 2 and 4 wherein steps 38 and 52 were described. As used herein "encoding" of bit string means any of the following: applying an error correcting code, using an encryption technique to make it appear that the bits have no discernible meaning, or applying an identity map that leaves the bit string intact. "Decoding" thus has a corresponding meaning depending on the type of encoding actually used. In the present invention, the password (or mapped password) and the signature are preferably "encoded" before being stored on the personal identification card. The encoding function may include two (2) distinct parts; for example, a first part that only affects the mapped password and a second part that only affects the signature. More specifically, the password/signature may be "encoded" using a predetermined encoding function that applies an error-coorecting code to the password and an identity map to the signature, or vice versa. Or, the encoding may encrypt both the password and the signature.

Although the invention has been described and illustrated in detail, the same is by way of example only and should not be taken by way of limitation. The spirit and scope of the present invention are limited only by the terms of the appended claims.

We claim:

1. A method for enabling an authorized user of a personal identification card to effect a transaction using a transaction terminal, comprising the steps of:
generating a first data string having a portion thereof which is derived from a physical characteristic of the authorized user and need not be retained secret;
digitally signing the first data string to generate a signature corresponding to the first data string;
encoding the first data string and the signature using a predetermined encoding function to generate an encoded first data string/signature;
storing the encoded first data string/signature on the personal identification card;
receiving the personal identification card at the transaction terminal;
decoding the encoded first data string/signature on the received personal identification card to generate the first data string and a received signature;
digitally verifying whether the received signature can be generated from the first data string;
if the received signature can be generated from the first data string, generating an indication that the signature is valid;
generating a representation from the first data string; and
displaying the representation and the indication on a display of the transaction terminal to enable an operator thereof to verify that the user is authorized to effect a transaction using the personal identification card.

2. The method as described in claim 1 wherein the digital signing and digital verify steps use a private key of a private key cryptosystem.

3. The method as described in claim 1 wherein the digital signing step uses a private key of a public-key cryptosystem pair and the digital verify step uses a public key of the public-key cryptosystem pair.

4. The method as described in claim 1 wherein the encoding function is an error-correcting function, an encryption function or an identify mapping function.

5. The method as described in claim 4 wherein one of the functions is applied to the first data string and another one of the functions is applied to the signature.

6. The method as described in claim 1 further including the step of:
augmenting the first data string to include data representing one or more facts about the authorized user.

7. The method as described in claim 1 further including the step of:
augmenting the first data string to include one or more codewords, each of said codewords authorizing a specific transaction using the personal identification card.

8. A method for enabling an authorized user of a personal identification card to effect a transaction using a transaction terminal, the personal identification card having stored therein a first data string having a portion thereof which is derived from a physical characteristic of the authorized user and need not be retained secret, and a signature of the first data string, comprising the steps of:
receiving the personal identification card at the transaction terminal;
digitally verifying whether the signature on the personal identification card received at the transaction terminal can be generated from the first data string;
if the signature can be generated from the first data string, generating an indication that the signature is valid;
generating a representation from the first data string; and
displaying the representation and the indication on a display of the transaction terminal to enable an operator thereof to verify that the user is authorized to effect a transaction using the personal identification card.

9. The method as described in claim 8 wherein the steps of generating a representation from the first data string and displaying the representation are carried out at or before the step of digitally verifying whether the signature can be generated from the first data string.

10. The method as described in claim 8 wherein the signature of the first data string and the step of digitally verifying the signature use a private key of a private key cryptosystem.

11. A method for enabling an authorized user of a personal identification card to effect a transaction using a transaction terminal, the personal identification card having a processor and a storage area, the storage area for storing a data string having a portion thereof which is derived from a physical characteristic of the authorized user and some other authorizing information, comprising the steps of:
(a) receiving the personal identification card at the transaction terminal;

(b) exchanging one or more messages between the personal identification card and the transaction terminal to enable the transaction terminal to verify whether the personal identification card contains the authorizing information;

(c) if the transaction terminal verifies that the personal identification card contains the authorizing information, generating an indication that the authorizing information is valid;

(d) generating a representation from the data string; and (e) displaying the representation and the indication on a display of the transaction terminal to enable an operator thereof to verify that the user is authorized to effect a transaction using the personal identification card.

12. The method as described in claim 11 wherein the authorizing information is a signature of the data string.

13. The method as described in claim 11 wherein the authorizing information is not the messages exchanged between the personal identification card and the transaction terminal.

14. The method as described in claim 11 wherein the exchanging of the one or more messages constitutes a proof of legitimacy of the authorized user.

15. A method for enabling an authorized user of a personal identification card to effect a transaction using a transaction terminal, the personal identification card having a processor and a storage area, the storage area for storing a data string Q, a value j equal to the one of the factors $\pm 1$ mod M and $\pm 2$ mod M that causes the product of j and Q modulo M to be a perfect square modulo M, and a signature z of the data string equal to the square root of the product, and where M equals a product of $P_1$ multiplied by $P_2$ and $P_1$ and $P_2$ are secret prime numbers, comprising the steps of:

(a) receiving the personal identification card at the transaction terminal;

(b) determining whether a predetermined number of legitimacy checks have been carried out on the personal identification card;

(c) if the predetermined number of legitimacy checks have not been carried out, exchanging one or more messages between the personal identification card and the transaction terminal to enable the transaction terminal to verify whether the personal identification card contains the signature z;

(d) if the transaction terminal verifies that the personal identification card contains the signature z, repeating step (b);

(e) if the predetermined number of legitimacy checks have been carried out, generating an indication that the signature z is valid;

(f) generation a representation from the data string; and (g) displaying the representation and the indication on a display of the transaction terminal to enable an operator thereof to verify that the user is authorized to effect a transaction using the personal identification card.

16. The method as described in claim 15, wherein the data string Q is a password mapped using a predetermined function F, the password having a portion thereof that is derived from a physical characteristic of the user and need not be retained secret.

17. The method as described in claim 15 wherein step (c) comprises the steps of:

generating a random number x modulo M in the personal identification card;

computing, in the personal identification card, the square y of the random number x modulo M and providing y to the transaction terminal;

assigning, at the transaction terminal, a first or second value to a bit and sending the bit to the personal identification card;

determining, in the personal identification card, whether the bit received from the transaction terminal has the first or second value;

if the bit having the first value has been received from the transaction terminal, providing W = x modulo M from the personal identification card to the transaction terminal;

determining, in the transaction terminal, whether the square of W equals y;

if the square of W equals y, repeating step (b);

if the square of W does not equal y, rejecting the personal identification card;

if the bit having the second value has been received from the transaction terminal, computing W = xz modula M in the personal identification card and providing W from the personal identification card to the transaction terminal;

determining, in the transaction terminal, whether the square of W equals the product yjQ modulo M;

if the square of W equals the product yjQ modulo M, repeating step (b); and if the square of W does not equal the product yjQ modulo M, rejecting the personal identification card.

* * * * *